(12) United States Patent
Yang

(10) Patent No.: US 12,555,626 B2
(45) Date of Patent: Feb. 17, 2026

(54) DATA PROGRAMMING METHOD AND RELATED MEMORY CONTROLLER AND DATA STORAGE DEVICE

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 148 days.

(21) Appl. No.: 18/621,085

(22) Filed: Mar. 28, 2024

(65) Prior Publication Data
US 2025/0006252 A1    Jan. 2, 2025

(30) Foreign Application Priority Data

Jun. 29, 2023   (TW) ................................. 112124277

(51) Int. Cl.
*G11C 11/4096* (2006.01)
*G11C 11/4093* (2006.01)
*G11C 29/52* (2006.01)

(52) U.S. Cl.
CPC ...... *G11C 11/4096* (2013.01); *G11C 11/4093* (2013.01); *G11C 29/52* (2013.01)

(58) Field of Classification Search
CPC . G11C 11/4096; G11C 11/4093; G11C 29/52; G11C 16/10; G11C 16/3436
USPC .................................................. 365/185.09
See application file for complete search history.

(56) References Cited

U.S. PATENT DOCUMENTS

| | | | |
|---|---|---|---|
| 2013/0238931 A1 | 9/2013 | Suzuki | |
| 2015/0161060 A1 | 6/2015 | Suzuki | |
| 2015/0248244 A1* | 9/2015 | Seo ........................ | G06F 3/0647 711/103 |
| 2018/0211696 A1* | 7/2018 | Kim ....................... | G11C 7/1072 |
| 2022/0108762 A1* | 4/2022 | Jang ....................... | G11C 29/42 |

FOREIGN PATENT DOCUMENTS

| | | | | |
|---|---|---|---|---|
| CN | 101882119 A | * | 11/2010 | ......... G06F 13/1673 |
| CN | 106170774 A | | 11/2016 | |
| CN | 112347007 A | | 2/2021 | |
| CN | 116170029 A | | 5/2023 | |
| KR | 20210013397 A | * | 2/2021 | ......... G11C 16/0483 |
| TW | 200820226 | | 5/2008 | |
| TW | 1525631 B | | 3/2016 | |

\* cited by examiner

*Primary Examiner* — Fernando Hidalgo
(74) *Attorney, Agent, or Firm* — Winston Hsu

(57) ABSTRACT

A data programming method for a flash memory includes: writing a write data to a page buffer of the flash memory; encoding the write data to generate first parity data corresponding to the write data, and writing the first parity data to the page buffer; while generating the first parity data, performing an error detection based on the write data and the first parity data to produce an error detection result; and when the error detection result indicates that there is no error in the first parity data, issuing a program command to the flash memory to program the write data and the first parity data in the page buffer into a flash memory element of the flash memory.

14 Claims, 6 Drawing Sheets

DATA PROGRAMMING METHOD AND RELATED MEMORY CONTROLLER AND DATA STORAGE DEVICE

BACKGROUND OF THE INVENTION

1. Field of the Invention

The present invention relates to flash memory, particularly to a data programming method, related memory controller, and data storage device that can enhance data integrity and the reliability of the data storage device.

2. Description of the Prior Art

Under extreme conditions, alpha particles may adversely impact data storage devices, such as causing data loss or errors. Alpha particles are positively charged particles that are typically produced during radioactive decay, possessing high energy and penetrating power. When data storage devices are exposed to environments containing large amounts of alpha particles, these high-energy particles may strike sensitive components of the data storage devices, such as semiconductor storage media and controllers. When alpha particles interact with electrons inside the data storage devices, this could cause local charge imbalances, thereby triggering transient currents and voltage fluctuations. These transient phenomena may negatively impact the reliability and integrity of the data storage devices, resulting in data loss, corruption, or errors. For example, in flash memory, when alpha particles penetrate a flash memory cell, they may alter the charge state stored therein, causing bit flipping, and thus leading to data corruption or errors. In extreme cases, the high-energy impact of alpha particles may even cause permanent damage to the flash memory cell, leading to data loss. Due to the significant potential harm alpha particles pose to the data storage devices, it is necessary to provide mechanism that can ensure high reliability and stability of the data storage devices under extreme environments like high-radiation conditions, further reducing potential risks posed by alpha particles and other radiation sources to the data storage devices.

SUMMARY OF THE INVENTION

In view of above, it is one object of the present invention to provide a data programming mechanism that can enhance data integrity and reliability of data storage devices. In embodiments of the present invention, an error check operation is performed on encoded data that is generated by a flash memory controller, thereby to determine whether to repeat data programming operations. Specifically, embodiments of present invention rely on read-back check operations to verify whether there are errors in data programmed to the flash memory, or rely on on-the-fly verification during an encoding process, thereby to ensure: no errors occur due to the impact of alpha particles during the encoding process, or no transmission errors occur while the data is being sent to the flash memory.

According to one embodiment, a data programming method for a flash memory is provided. The data programming method comprises: writing write data into a page buffer of the flash memory; encoding the write data to generate first check data corresponding to the write data, and writing the first check data into the page buffer; performing an error detection based on the write data and the first check data to generate an error detection result while generating the first check data; and issuing a program command to the flash memory to program the write data and the first check data stored the page buffer into a flash memory element of the flash memory if the error detection result indicates that there is no error in the first check data.

According to one embodiment, a data programming method for a flash memory is provided. The data programming method comprises: encoding write data to generate first check data corresponding to the write data, and writing the write data and the first check data into a page buffer of the flash memory; sending a program command to program the write data and the first check data that is stored in the page buffer into a flash memory element of the flash memory; reading back the write data and the first check data from the page buffer, and decoding the read write data and the read first check data to generate an error detection result; and if the error detection result indicates that there is an error in the first check data, re-encoding the write data to generate a second check data corresponding to the write data, and programming the write data and the second check data into the flash memory.

According to one embodiment, a memory controller for use in a flash memory is provided. The memory controller comprises: a storage unit, a processing unit, an encoder, a verification circuit. The storage unit is configured to store program codes. The processing unit is configured to execute the program codes to perform operations of programming write data to the flash memory. The encoder is configured to encode the write data to generate first check data corresponding to the write data. The verification circuit is configured to perform an error detection based on the write data and the first check data to generate an error detection result while the encoder is generating the first check data. Additionally, the processing unit is further configured to: write the write data and the first check data into a page buffer of the flash memory; and issuing a program command to the flash memory to program the write data and the first check data stored the page buffer into a flash memory element of the flash memory if the error detection result indicates that there is no error in the first check data.

According to one embodiment, a memory controller for use in a flash memory is provided. The memory controller comprises a storage unit configured to store program codes; a processing unit configured to execute the program codes to perform operations of programming write data to the flash memory; an encoder configured to encode the write data to generate first check data corresponding to the write data; a decoder, configured to decode the read write data and the read first check data to generate an error detection result. Additionally, the processing unit is configured to write the write data and the first check data into a page buffer of the flash memory and read back the write data and the first check data from the page buffer after writing is done. Additionally, if the error detection result indicates that there is an error in the first check data, the encoder is configured to re-encode the write data to generate a second check data corresponding to the write data, and the processing unit is configured to program the write data and the second check data into the flash memory.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
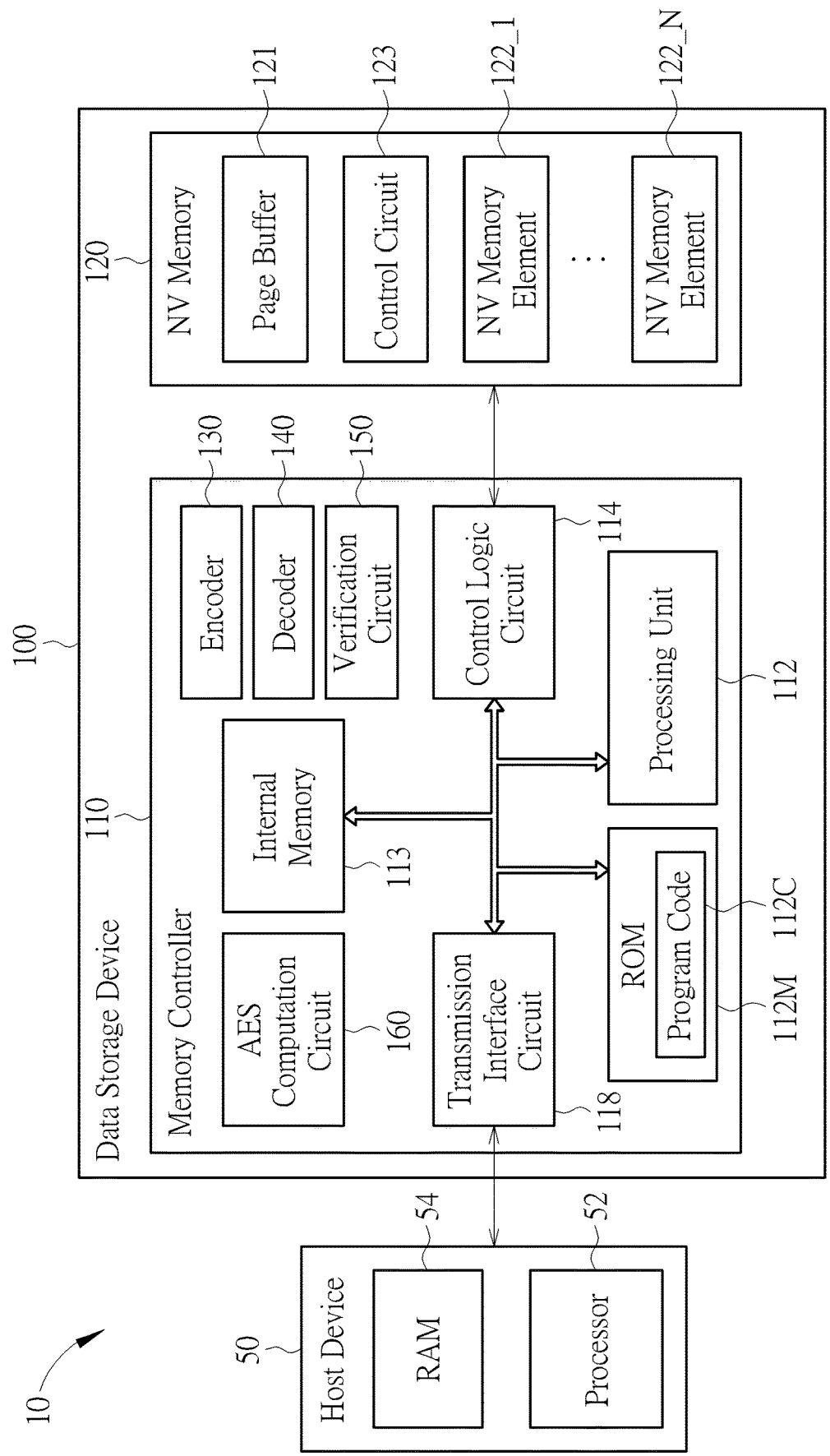
FIG. 1 illustrates a schematic diagram of a data storage device according to one embodiment of the present invention.

FIG. 1 is a schematic diagram illustrating an electronic device 10 according to one embodiment of the present invention, where the electronic device 10 comprises a host device 50 and a data storage device 100. The host device 50 may comprise: at least one processor 52 configured to control operations of the host device 50, and a random access memory 54 configured to store data and information required by the processor 52. Examples of the host device 50 may include, but are not limited to: a smartphone, a tablet computer, a wearable device, a personal computer such as a desktop computer or a laptop computer, an imaging device such as a digital still camera or a video camera, a game console, a car navigation system, a printer, a scanner, or a server system. Examples of the data storage device 100 may include, but are not limited to: a portable memory device (such as a memory card conforming to SD/MMC, CF, MS, XD, or UFS specifications), a solid-state drive (SSD), and various embedded storage devices (such as an embedded storage device conforming to UFS or EMMC specifications).

According to various embodiments, the data storage device 100 may comprise a controller such as a memory controller 110 and may further comprise a non-volatile (NV) memory 120. The NV memory 120 is configured to store data and information. The NV memory 120 may comprise one or more NV memory elements, such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or memory cells having a three-dimensional structure.

As shown in FIG. 1, the memory controller 110 may comprise a processing unit 112, a read-only memory (ROM) 112M, an internal memory 113, a control logic circuit 114, and a transmission interface circuit 118, a buffer 125, an encoder 130, a decoder 140 and a verification 150, an advanced encryption standard (AES) computation circuit 160. At least one portion (e.g. a portion or all) of these circuits and components may be coupled to one another through a bus. The internal memory 113 can be implemented by one or more RAM devices. For example, the internal memory 113 may be a static RAM (SRAM) and/or a dynamic RAM (DRAM). The internal memory 113 may be configured to provide internal storage space for the memory controller 110, for example, temporarily storing information, such as data, addresses, commands, mapping information, and/or variable/parameters. In some embodiments, the memory controller 110 may not include the internal memory 113. Instead, the memory controller 110 may rely on host memory buffer (HMB) technology. With the HMB, the memory controller 110 could utilize the RAM 54 (such as DRAM) of the host device 50, as a whole, a part or an extension of the internal memory 113, thereby improving the read and write performance of the data storage device 100. Otherwise, the buffer 125 could be a part of the internal memory 113. In addition, the ROM 112M of this embodiment is configured to store a program code 112C, and the processing unit 112 is configured to execute the program code 112C to control access of the NV memory 120. Alternatively, the program code 112C may be stored in the NV memory 120.

The memory controller 110 controls reading, writing, and erasing of the NV memory 120 through a control logic circuit 114. In addition, the memory controller 110 could perform writing of data based on host commands from the host device 50 and writing of valid data which is read from the NV memory 120 by the garbage collection and/or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCI-E) specification, Multimedia embedded Card (eMMC) specification, or Universal Flash Storage (UFS) specification) and may perform communications with the host device 50 according to the specific communications specification.

Typically, the host device 50 may indirectly access the memory device 100, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, program or erase operations upon memory units or data pages having physical addresses within the NV memory 120. The NV memory 120 includes one or more page buffers 121 (which may be implemented by SRAM), and one or more control circuits 123. Data that the memory controller 110 intends to program to the NV memory 120 will be written into the page buffer 121. The one or more control circuits 123 will read, program, or erase data based on the memory operation commands sent by the memory controller 110. When the memory controller 110 performs an erase operation on any one of the multiple NV memory elements 122_1-122_N, at least one block in the NV memory element 122_k may be erased. In addition, each block of the NV memory element 122_k can include multiple pages, and access operations (for example, read or program) are performed on one or more pages.

In one embodiment, each of the NV memory elements 122_1-122_N may be an NV memory die or chip. Each of NV memory dies 122_1-122_N has a control circuit for executing memory operation commands issued by the memory controller 110. In addition, each of NV memory dies 122_1-122_N may include multiple planes. Each plane may have multiple blocks composed of memory cells, as well as related row and column control circuits. The memory cells in each plane may be arranged in a 2D or 3D memory structure. Moreover, multiple operations can be performed simultaneously on different planes through a multi-plane operation command. For example, multiple operations (such as read, program, erase) can be performed in parallel (simultaneously) on memory blocks of different planes through a multi-plane operation command.

In one embodiment, the memory controller 110 can be configured to group memory blocks in the NV memory 120 into multiple super blocks. In one embodiment, grouping of super blocks can span across NV memory dies 122_1-122_N. Moreover, super blocks can be used as one or more storage blocks in each of NV memory dies 122_1-122_N.

In one embodiment, a logical-to-physical (L2P) address mapping table, including multiple L2P address mapping entries, can be divided into multiple mapping groups. Each mapping group includes a portion of mapping entries of the L2P address mapping table to perform logical to physical address translation. These mapping groups are permanently stored in blocks of the NV memory 120 and are loaded to the internal memory 113 when needed. Similarly, a physical-to-logical (P2L) address mapping table, including multiple P2L address mapping entries, can be divided into multiple mapping groups. Each mapping group includes a portion of mapping entries of the P2L address mapping table to perform physical to logical address translation. These mapping groups are permanently stored in blocks of the NV memory 120 and are loaded to the internal memory 113 when needed.

Typically, the memory controller 110 will perform program (i.e., write), read, or erase operations based on host commands from the host device 50. In a typical writing process, the host write commands sent from the host device 50 contain write addresses (i.e., logical addresses) and data to be written. The data to be written may be processed by the AES computation circuit 160 to perform AES decryption (if the host device 50 has previously encrypted the data with AES encryption). The processed data (hereinafter referred to as write data DAT) is temporarily stored in a buffering area of the internal memory 113 (hereinafter referred to as a buffer 113, which may be DRAM or SRAM). In such process, a specific error correction mechanism may be employed to protect the write data DAT. Before writing the write data DAT to the NV memory 120, it will be read from the buffer 113 to the encoder 130 for encoding, thereby generating check data (i.e., parity data or parity bits) PTY. The check data PTY will be appended to the end of the write data DAT, both of which will be considered as encoded data (i.e., systematic encoding) and written to the NV memory 120. During the writing process, the encoded data is first written to the page buffer 121. After the memory controller 110 sends a program command to the control circuit 123 in the NV memory 120, the encoded data will be programmed on one or more pages (or super pages) of an NV memory element 122_k of the NV memory 120. On the other hand, during the reading process, the encoded data (the write data DAT and its corresponding check data PTY) will be read from the NV memory 120. The decoder 140 will decode the read encoded data, thereby detecting and correcting errors based on corresponding encoding and decoding architecture. In one embodiment, the encoder 130 and the decoder 140 can be Low-Density Parity-Check (LDPC) code encoder and decoder.

During the process of writing data to the NV memory 120, the encoder 130 may be attacked by alpha particles, resulting in the generation of erroneous check data PTY. Alternatively, bit errors may occur during high-speed transmission when writing the check data PTY into the page buffer 121. To verify data integrity, the present invention will determine whether there are any errors in the encoded data that has been written into the NV memory 120.

Figure 2:
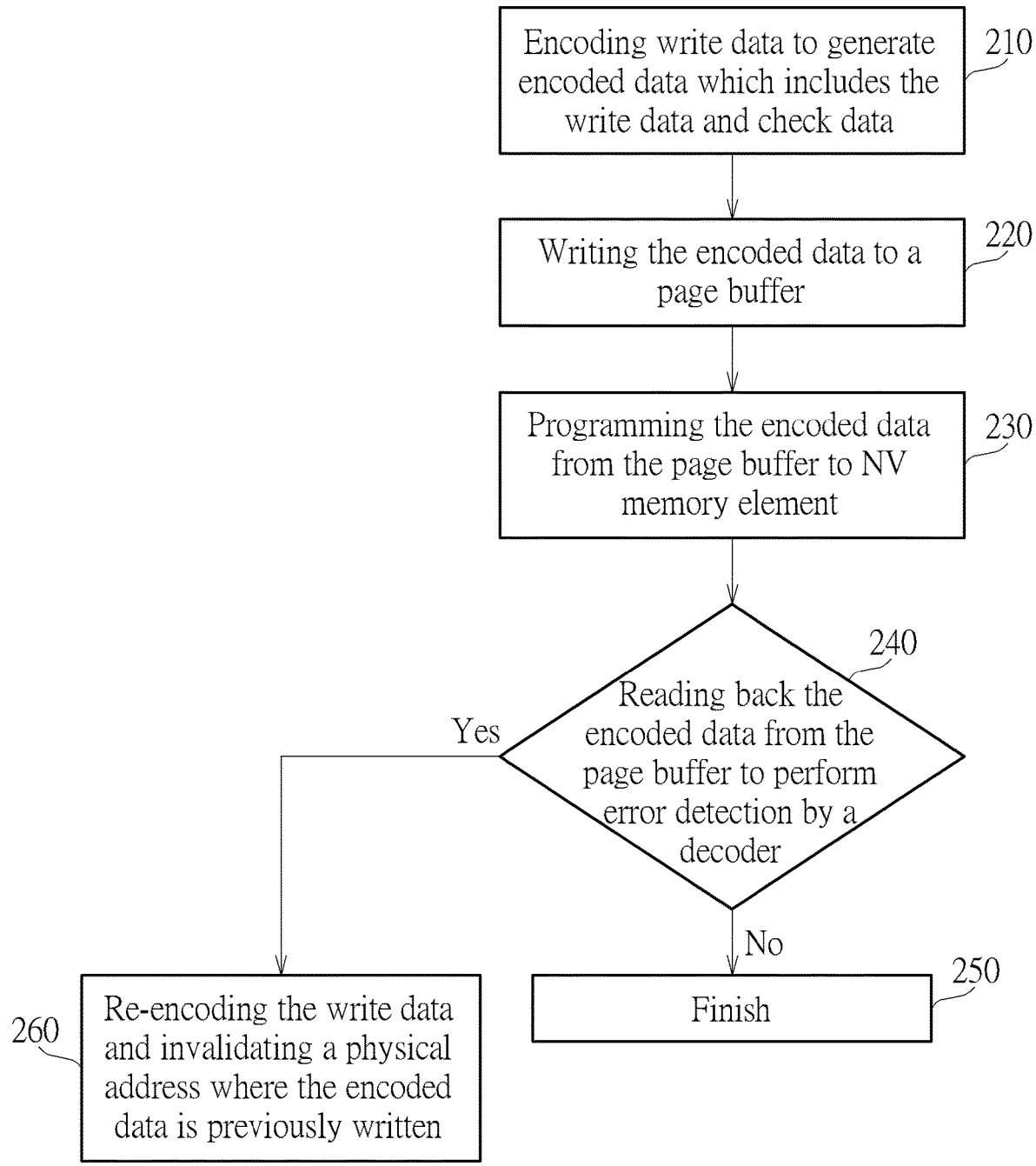
FIG. 2 illustrates a flow chart of a data programming method according to a first embodiment of the present invention.
Figure 3:
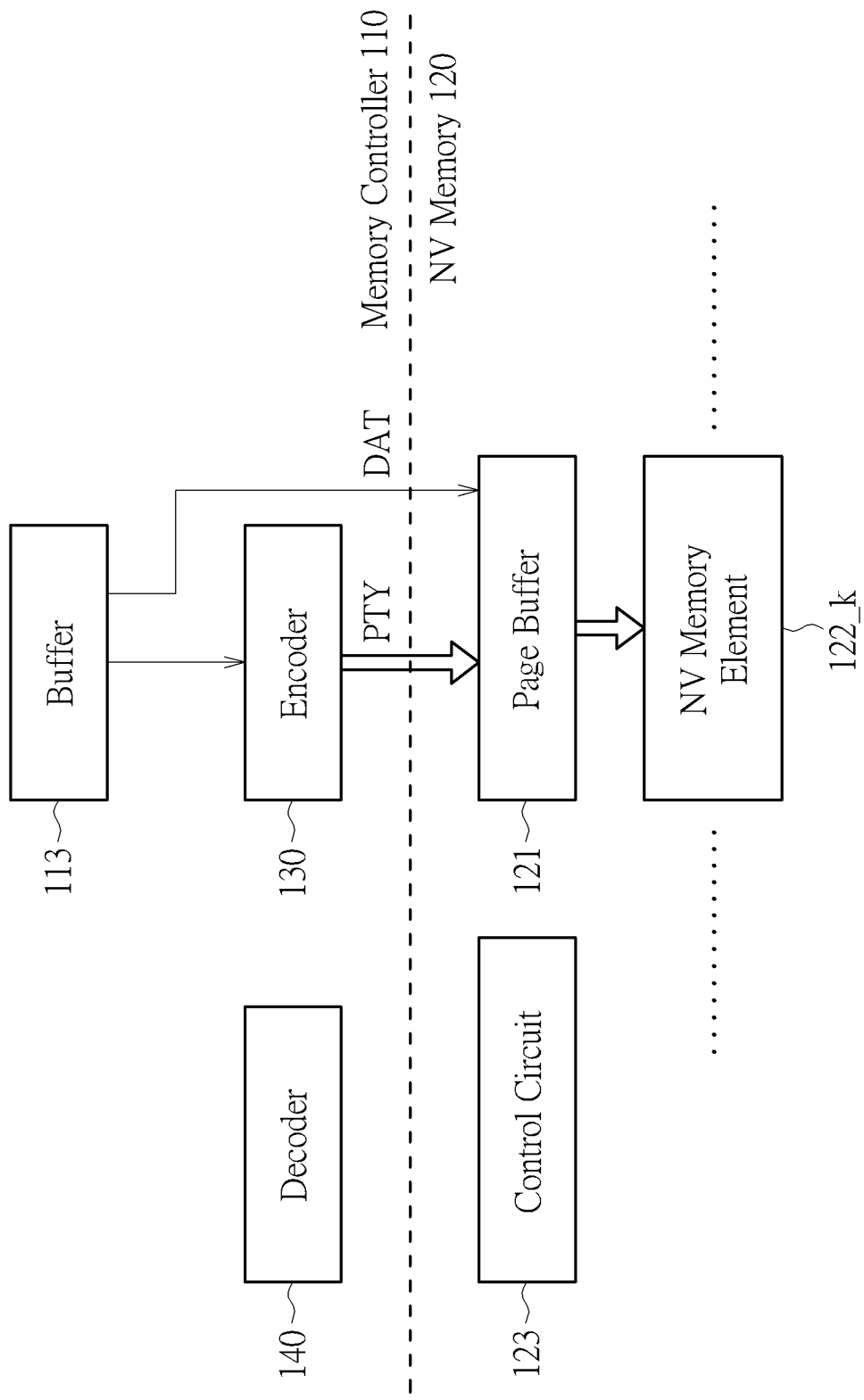
FIG. 3 illustrates a schematic diagram of partial architecture of the memory controller and NV memory according to the first embodiment of the present invention.

In one embodiment, the present invention carries out a read-back check operation to determine whether there are errors in the encoded data. Please refer to a flow chart shown in FIG. 2, as well as a schematic diagram of partial architecture of the memory controller 110 and the NV memory 120 shown in FIG. 3. First, at step 210, write data DAT to be written by the host device 50 is read from the buffer 113 and then encoded by the encoder 130 to generate encoded data (which includes write data DAT and check data PTY). At step 220, the encoded data is written to the page buffer 121 of NV memory 120. At step 230, the memory controller 110 sends a program command to the control circuit 123 in NV memory 120. The control circuit 123 programs the encoded data from the page buffer 121 to the NV memory element 122_k. At step 240, the memory controller 110 reads back just-written encoded data from the page buffer 121, and accordingly decodes it through the decoder 140, thereby to determine whether there is an error (for example, performing LDPC decoding to perform error detection). If yes, the flow proceeds to step 260, re-encoding the write data DAT, generating check data PTY', and accordingly writing both to another physical address of NV memory element 122_k (or another NV memory element of NV memory 120). After that, the read-back check operation is performed again (i.e., repeating steps 210-240). Until no error is found, the write operation of the write data DAT is considered completed. If no errors are found in step 240, the flow ends and the write operation is completed (at step 250). On the other hand, at step 260, in addition to re-encoding the write data DAT and writing the encoded data to NV memory 120, the memory controller 110 also invalidate the physical address (recorded in an address mapping table) where the write data DAT and its corresponding check data PTY were written in step 230. In view of this, it can be understood that in the above embodiment, errors are checked by reading back the encoded data that has been written into the page buffer 121 of NV memory 120.

However, in another embodiment of the present invention, the encoded data is first written into the page buffer. Only after verification is passed, the encoded data is written into the NV memory element 122_k. Please refer to a flow chart shown in FIG. 4, as well as schematic diagram of partial architecture of the memory controller 110 and the NV memory 120 shown in FIG. 5. First, at step 310, write data DAT to be written by the host device 50 is read from the buffer 113 and written into the page buffer 121 of the NV memory 120. At step 320, the write data DAT is encoded to generate corresponding check data PTY. Accordingly, the generated check data PTY is written into the page buffer 121. At step 330, while generating the check data PTY, the verification circuit 150 is employed to verify (i.e., on-the-fly verification) the write data DAT and the check data PTY, thereby generating an error detection result. In one embodiment, the verification circuit 150 may include another encoder similar to the encoder 130. This encoder in the verification circuit 150 will re-encode the write data DAT and generate another check data. The another check data generated by the verification circuit 150 will be compared with the check data PTY generated by the encoder 130. If they are consistent, it means that no error has occurred (for example, there is no error in the check data PTY). Otherwise, it means that an error has occurred. In another embodiment, the verification circuit 150 may include a check equation verification circuit, which obtains multiple check equations based on a check matrix that is used to generate the check data PTY. The write data DAT and the check data PTY will be inputted into the multiple check equations for verification. If all the multiple check equations are not satisfied simultaneously, it is deemed that an error has occurred. In one embodiment, the check matrix can be a parity check matrix in LDPC encoding, and a check equation is generated by one of rows of the parity check matrix. At step 340, it is determined whether the error detection result indicates that an error has occurred. If so, the flow proceeds to step 360, the write data DAT is written from the buffer 113 to the page buffer 121 again. In addition, the encoder 130 is employed to re-encode the write data DAT to generate new check data PTY', which will be verified through the verification circuit 150. Until no errors are found (i.e., repeating steps 310-340), the write operation of the write data DAT is considered completed. If the detection result of step 340 is no, the flow proceeds to step 350, where the memory controller 110 will issue a program command to the control circuit 123 of the NV memory 120, such that the control circuit 123 will program the write data DAT and check data PTY in the page buffer 121 to one or more pages of the NV memory element 122_k. As a result, the flow ends. In this embodiment, before the encoded data passes verification, it is only written into the page buffer 121, but not programmed to the NV memory element 122_k. Therefore, the cost of encoding errors is relatively less since it will not lead to invalid data on the NV memory 120, and also saves the time of programming data to the NV memory elements of the NV memory 120.

Figure 4:
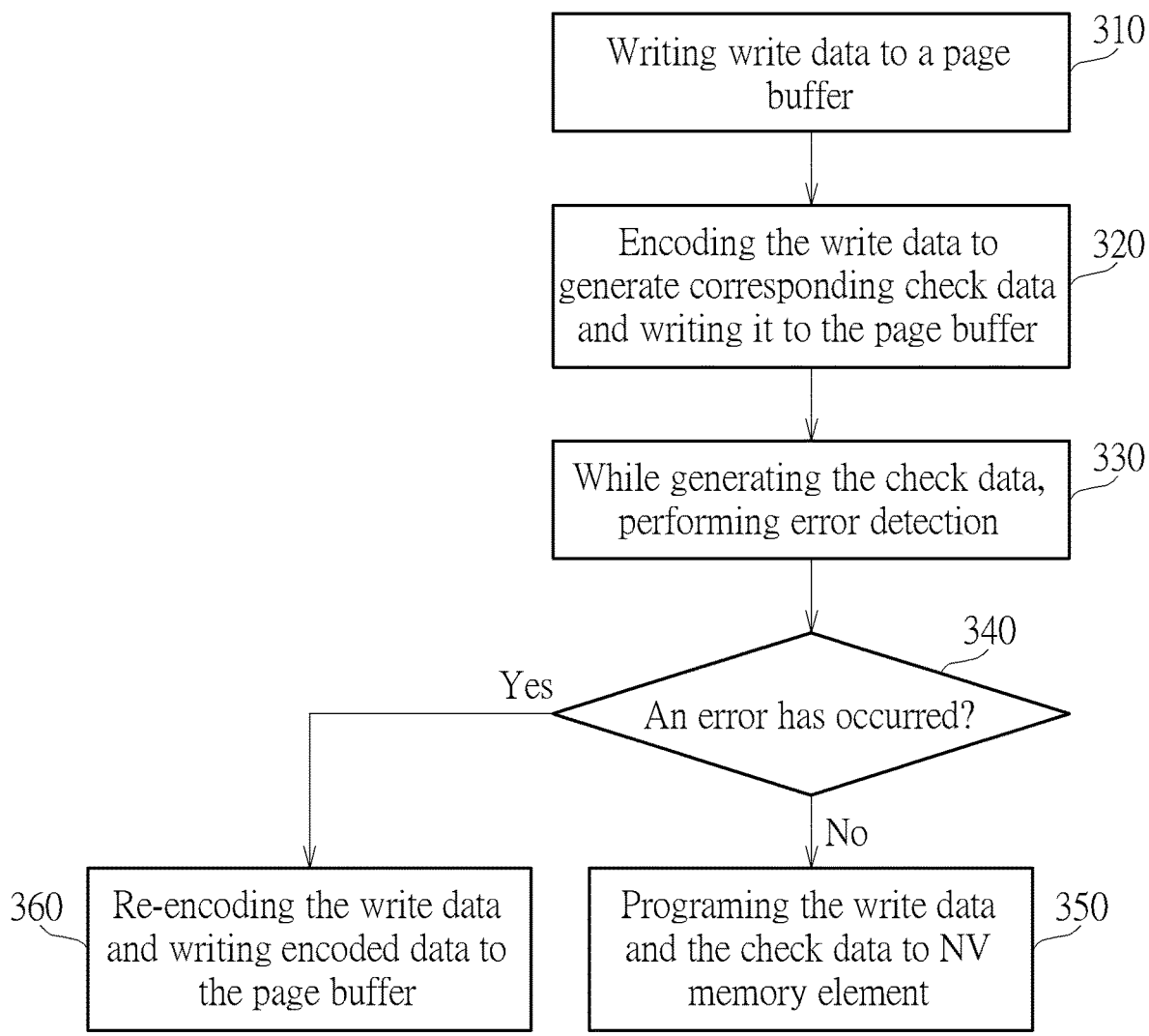
FIG. 4 illustrates a flow chart of a data programming method according to a second embodiment of the present invention.
Figure 5:
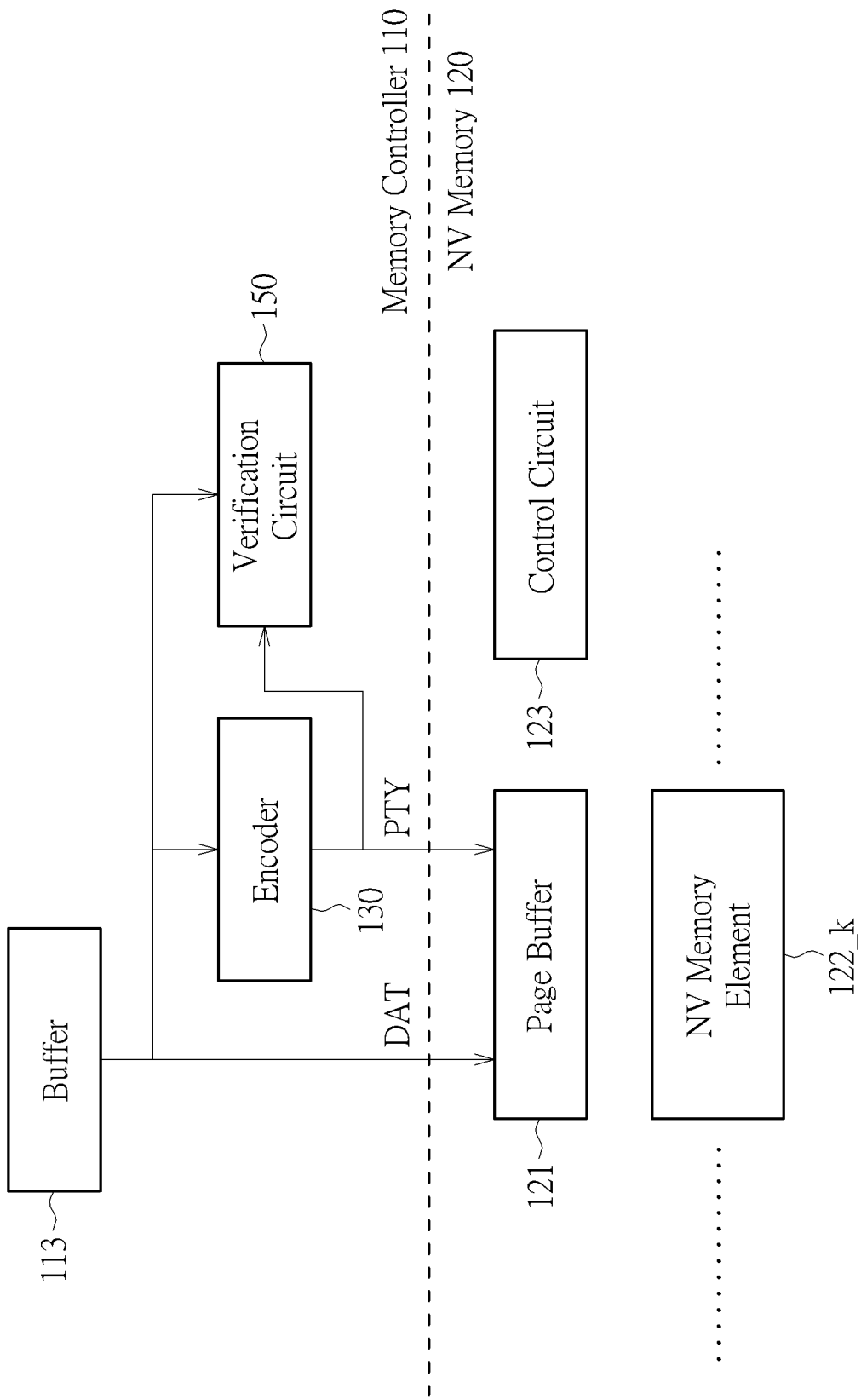
FIG. 5 illustrates a schematic diagram of partial architecture of the memory controller and NV memory according to the second embodiment of the present invention.
Figure 6:
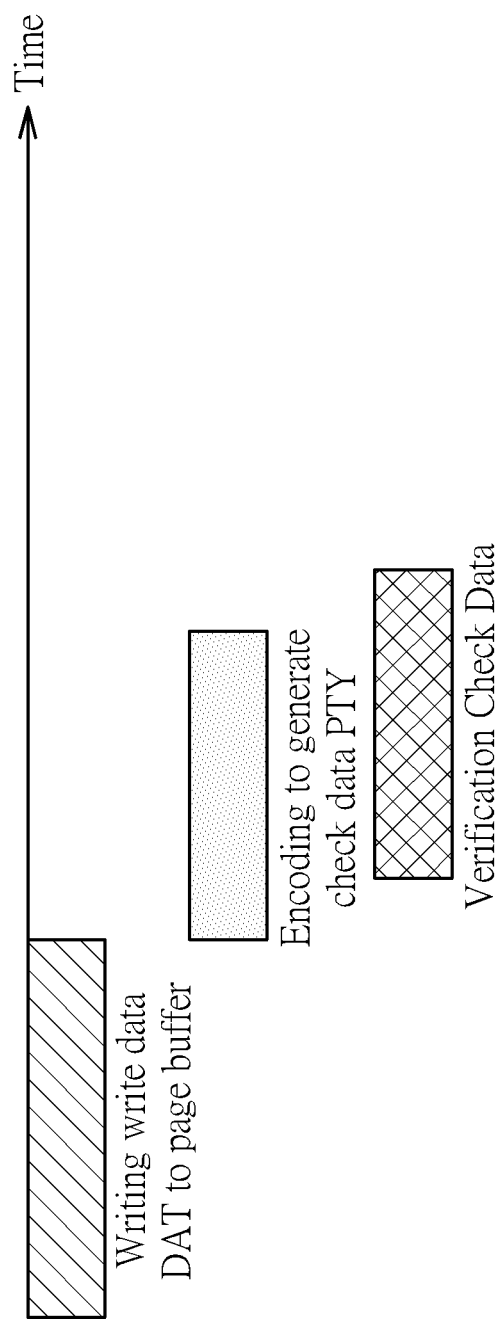
FIG. 6 illustrates a timing diagram of data programming, encoding, and error detection in the second embodiment of the present invention.

FIG. 6 illustrates a timing diagram of data programming and data encoding regarding embodiments of FIGS. 4 and 5. In this embodiment, the write data DAT is first written into the page buffer 121. After writing of the write data DAT into the page buffer 121 is completed, the encoder 130 begins to encode the write data DAT to generate check data PTY. Once the encoder 130 starts to output the check data PTY bit by bit, the verification circuit 150 will immediately (on-the-fly) perform error detection on the write data DAT and generated portion (e.g. partial bits) of check data PTY. If an error is detected, as shown by the timing illustrated by FIG. 6, the write data DAT will be written into the page buffer 121 again (overwriting the previous write), the write data DAT will be encoded again, and the re-generated portion of check data PTY will be verified again. As can be seen from FIG. 6, the output of the check data PTY from the encoder 130 and the error detection performed by the verification circuit 150 are almost simultaneous, which can shorten the delay caused by error detection, such that the write operation of the write data DAT will not take longer time due to error detection.

In summary, the program mechanism provided by the present invention can be used to eliminate two types of errors. First, the encoder generates erroneous check data due to alpha particle attacks. Second, bit errors caused by high-speed transmission during the transfer of check data to flash memory. Through the program mechanism provided by the present invention, the reliability of data storage devices can be improved, thereby ensuring data integrity.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data programming method for a flash memory, comprising:
　writing write data into a page buffer of the flash memory;
　encoding the write data to generate first check data corresponding to the write data, and writing the first check data into the page buffer;
　performing an error detection based on the write data and the first check data to generate an error detection result while generating the first check data; and issuing a program command to the flash memory to program the write data and the first check data stored the page buffer into a flash memory element of the flash memory if the error detection result indicates that there is no error in the first check data.

2. The data programming method of claim 1, wherein the step of performing the error detection based on the write data and the first check data comprises:
re-encoding the write data to generate a second check data;
comparing the second check data with the first check data; and
generating the error detection result indicating that there is no error in the first check data if the second check data is consistent with the first check data.

3. The data programming method of claim 1, wherein the step of performing the error detection based on the write data and the first check data comprises:
obtaining multiple check equations based on a check matrix that is used to generate the first check data;
inputting the write data and the first check data into the multiple check equations; and
generating the error detection result indicating that there is no error in the first check data if all the multiple check equations are satisfied.

4. The data programming method of claim 1, further comprising:
if the error detection result indicates that there is an error in the first check data, writing the write data into the page buffer again;
re-encoding the write data to generate a third check data corresponding to the write data, and writing the third check data into the page buffer; and
while generating the third check data, performing the error detection based on the write data and the third check data to generate another error detection result.

5. A data programming method for a flash memory, comprising:
encoding write data to generate first check data corresponding to the write data, and writing the write data and the first check data into a page buffer of the flash memory;
sending a program command to program the write data and the first check data that is stored in the page buffer into a flash memory element of the flash memory;
reading back the write data and the first check data from the page buffer, and decoding the read write data and the read first check data to generate an error detection result; and
if the error detection result indicates that there is an error in the first check data, re-encoding the write data to generate a second check data corresponding to the write data, and programming the write data and the second check data into the flash memory.

6. The data programming method of claim 5, wherein invalidating a physical address of the flash memory element of the flash memory where the write data and the first check data are written if the error detection result indicates that there is an error in the first check data.

7. A memory controller for use in a flash memory, comprising:
a storage unit, configured to store program codes;
a processing unit, configured to execute the program codes to perform operations of programming write data to the flash memory;
an encoder, configured to encode the write data to generate first check data corresponding to the write data; and
a verification circuit, configured to perform an error detection based on the write data and the first check data to generate an error detection result while the encoder is generating the first check data;
wherein the processing unit is further configured to:
write the write data and the first check data into a page buffer of the flash memory; and
issuing a program command to the flash memory to program the write data and the first check data stored the page buffer into a flash memory element of the flash memory if the error detection result indicates that there is no error in the first check data.

8. The memory controller of claim 7, wherein the encoder is configured to re-encoding the write data to generate a second check data; and the verification circuit is configured to compare the second check data with the first check data, wherein the verification circuit generates the error detection result indicating that there is no error in the first check data if the second check data is consistent with the first check data.

9. The memory controller of claim 7, wherein the verification circuit is configured to obtain multiple check equations based on a check matrix that is used to generate the first check data and configured to input the write data and the first check data into the multiple check equations, wherein the verification circuit generates the error detection result indicating that there is no error in the first check data if all the multiple check equations are satisfied.

10. The memory controller of claim 7, wherein if the error detection result indicates that there is an error in the first check data, the processing unit is configured to write the write data into the page buffer again, and the encoder is configured to re-encode the write data to generate a third check data corresponding to the write data, and the processing unit is configured to write the third check data into the page buffer, wherein while the encoder is generating the third check data, the verification circuit is configured to perform the error detection based on the write data and the third check data to generate another error detection result.

11. A data storage device comprising the memory controller of claim 7 and a flash memory.

12. A memory controller for use in a flash memory, comprising:
a storage unit, configured to store program codes;
a processing unit, configured to execute the program codes to perform operations of programming write data to the flash memory;
an encoder, configured to encode the write data to generate first check data corresponding to the write data, wherein the processing unit is configured to write the write data and the first check data into a page buffer of the flash memory and read back the write data and the first check data from the page buffer after writing is done; and
a decoder, configured to decode the read write data and the read first check data to generate an error detection result;
wherein if the error detection result indicates that there is an error in the first check data, the encoder is configured to re-encode the write data to generate a second check data corresponding to the write data, and the processing unit is configured to program the write data and the second check data into the flash memory.

13. The memory controller of claim 12, wherein the processing unit is configured to invalidate a physical address of the flash memory element of the flash memory where the write data and the first check data are written if the error detection result indicates that there is an error in the first check data.

14. A data storage device comprising the memory controller of claim 12 and a flash memory.

* * * * *